US010284767B2

(12) United States Patent
Ishii et al.

(10) Patent No.: US 10,284,767 B2
(45) Date of Patent: May 7, 2019

(54) SHOOTING DEVICE, SHOOTING METHOD, AND NON-TRANSITORY COMPUTER READABLE RECORDING MEDIUM STORING PROGRAM

(71) Applicant: Olympus Corporation, Hachioji-shi, Tokyo (JP)

(72) Inventors: Kensuke Ishii, Tokyo (JP); Saori Matsumoto, Tokyo (JP); Arata Shinozaki, Tokyo (JP); Kiiko Takamatsu, Tokyo (JP); Yoshitaka Sata, Tokyo (JP)

(73) Assignee: Olympus Corporation, Tokyo (JP)

(*) Notice: Subject to any disclaimer, the term of this patent is extended or adjusted under 35 U.S.C. 154(b) by 11 days.

(21) Appl. No.: 15/581,257

(22) Filed: Apr. 28, 2017

(65) Prior Publication Data

US 2017/0230566 A1  Aug. 10, 2017

Related U.S. Application Data

(63) Continuation of application No. PCT/JP2014/079200, filed on Nov. 4, 2014.

(51) Int. Cl.
*H04N 5/232* (2006.01)
*H04N 5/235* (2006.01)
(Continued)

(52) U.S. Cl.
CPC ........... *H04N 5/23209* (2013.01); *G03B 7/00* (2013.01); *G03B 13/36* (2013.01); *G03B 17/02* (2013.01);
(Continued)

(58) Field of Classification Search
CPC ....... G02B 23/14–23/145; G03B 17/20; G03B 13/00–13/16; G03B 2213/00–2213/025
(Continued)

(56) References Cited

U.S. PATENT DOCUMENTS 7,046,344 B2 * 5/2006 Yamamoto ............... G01O 3/08
356/4.01
2013/0076936 A1 * 3/2013 Yoshida ............. H04N 5/23219
348/222.1

(Continued)

FOREIGN PATENT DOCUMENTS

JP   2000-111994   4/2000
JP   2009-042471   2/2009

OTHER PUBLICATIONS

International Search Report to corresponding International Application No. PCT/JP2014/079200, dated Jan. 27, 2015 (1 pg.), with translation (1 pg.).

*Primary Examiner* — Xi Wang
(74) *Attorney, Agent, or Firm* — John C. Pokotylo; Pokotylo Patent Services

(57) ABSTRACT

A shooting device includes a shooting module; a detection unit that detects whether a finder device is mounted on the shooting device; a storage module that stores first information and second information; and a control unit that controls a lens module to perform a first operation based on the first information and a second operation based on the second information, wherein the first information and the second information indicates a range of a parameter for controlling the lens module, the parameter is used for controlling an aperture or an angle of view of the lens module, the range indicated by the first information is determined by excluding a partial range from the range indicated by the second information based on whether the parameter is used for controlling the aperture or the angle of view of the lens module.

4 Claims, 12 Drawing Sheets

(51) Int. Cl.
*H04N 5/238* (2006.01)
*G03B 13/36* (2006.01)
*G03B 7/00* (2014.01)
*G03B 17/02* (2006.01)

(52) U.S. Cl.
CPC ..... *H04N 5/23206* (2013.01); *H04N 5/23293* (2013.01); *H04N 5/23296* (2013.01); *G03B 2206/00* (2013.01); *H04N 5/238* (2013.01); *H04N 5/2353* (2013.01); *H04N 5/2355* (2013.01); *H04N 5/2356* (2013.01); *H04N 5/23212* (2013.01); *H04N 5/23219* (2013.01); *H04N 5/23245* (2013.01)

(58) Field of Classification Search
USPC ............. 356/8; 396/141, 148–152, 373–386; 348/341, 333.01–333.13
See application file for complete search history.

(56) References Cited

U.S. PATENT DOCUMENTS

| | | | | |
|---|---|---|---|---|
| 2013/0176482 A1* | 7/2013 | Hirasawa | ................ | G03B 7/16 348/370 |
| 2014/0022408 A1* | 1/2014 | Nashizawa | .......... | H04N 5/2355 348/222.1 |
| 2015/0362720 A1* | 12/2015 | Saito | ................... | G02B 25/001 359/644 |

* cited by examiner

FIG. 8

| MOUNTING STATE OF FINDER DEVICE | SHOOTING MODE | | | |
|---|---|---|---|---|
| | | | | A12 |
| NOT MOUNTED | FULL AUTO | PROGRAMMABLE AUTO | SHUTTER SPEED PRIORITY | APERTURE PRIORITY | MANUAL |
| MOUNTED | FULL AUTO | PROGRAMMABLE AUTO | | | |

| MOUNTING STATE OF FINDER DEVICE | FOCUS CONTROL ALGORITHM | | A22 |
|---|---|---|---|
| NOT MOUNTED | FACE PRIORITY | SINGLE AF IN WHICH CENTER IS TARGET | CONTINUOUS AF |
| MOUNTED | FACE PRIORITY | SINGLE AF IN WHICH CENTER IS TARGET | MANUAL |

| MOUNTING STATE OF FINDER DEVICE | FOCUS PARAMETER |
|---|---|
| NOT MOUNTED | APERTURE VALUE: F3.5 TO F22 — A32 |
| MOUNTED | APERTURE VALUE: F5.6 TO F22 — A31 |

FIG. 11

| MOUNTING STATE OF FINDER DEVICE | EXPOSURE CONTROL ALGORITHM A42 | | |
|---|---|---|---|
| NOT MOUNTED | CENTER-WEIGHTED AVERAGE METERING | FACE PRIORITY | SPOT METERING |
| MOUNTED | CENTER-WEIGHTED AVERAGE METERING | FACE PRIORITY | |

| MOUNTING STATE OF FINDER DEVICE | ANGLE OF VIEW PARAMETER |
|---|---|
| NOT MOUNTED | 28 mm (WIDE END) to 84 mm (TELE END)　A52 |
| MOUNTED | 28 mm (WIDE END) to 36 mm　A51 |

FIG. 13

| MOUNTING STATE OF FINDER DEVICE | SINGLE SHOOTING OR CONSECUTIVE SHOOTINGS A62 | |
|---|---|---|
| NOT MOUNTED | FOCUS BRACKET | SINGLE SHOOTING |
| MOUNTED | FOCUS BRACKET A61 | |

FIG. 14

| MOUNTING STATE OF FINDER DEVICE | SINGLE SHOOTING OR CONSECUTIVE SHOOTINGS A72 | | |
|---|---|---|---|
| NOT MOUNTED | EXPOSURE BRACKET | ISO BRACKET | HDR BRACKET / SINGLE SHOOTING |
| MOUNTED | EXPOSURE BRACKET | ISO BRACKET | HDR BRACKET A71 |

FIG. 15

| MOUNTING STATE OF FINDER DEVICE | SINGLE SHOOTING OR CONSECUTIVE SHOOTINGS A82 | | |
|---|---|---|---|
| NOT MOUNTED | WHITE BALANCE BRACKET | SPECIFIC FILTER BRACKET | ONE IMAGE PROCESSING |
| MOUNTED | WHITE BALANCE BRACKET | SPECIFIC FILTER BRACKET | |

| MOUNTING STATE OF FINDER DEVICE | SINGLE SHOOTING OR CONSECUTIVE SHOOTINGS A92 | |
|---|---|---|
| NOT MOUNTED | N TIMES OF SHOOTING IS PERFORMED PER SECOND FROM M SECONDS BEFORE REFERENCE TIMING | SINGLE SHOOTING |
| MOUNTED | N TIMES OF SHOOTING IS PERFORMED PER SECOND FROM M SECONDS BEFORE REFERENCE TIMING | |

A91

SHOOTING DEVICE, SHOOTING METHOD, AND NON-TRANSITORY COMPUTER READABLE RECORDING MEDIUM STORING PROGRAM

This application is a continuation application based on a PCT International Application No. PCT/JP2014/079200, filed on Nov. 4, 2014. The content of the PCT International Application is incorporated herein by reference.

BACKGROUND OF THE INVENTION

Field of the Invention

The present invention relates to a shooting device, a shooting method, and a non-transitory computer readable recording medium storing program.

Description of Related Art

A shooting device including a finder device that is an optical finder or an electronic finder is known. For example, in Japanese Unexamined Patent Application, First Publication No. 2000-111994, a camera is disclosed on which an optical finder and an electronic finder can be mounted, in which an operation of a monitor display is changed according to a type of finder device mounted on the camera.

In general, a finder device is small. In some cases, it is difficult for a user to confirm a setting of shooting through confirmation of an optical image or an image displayed by a finder device. Therefore, in some cases, the setting of the shooting is not suitable for a scene or the like, that is, the setting of the shooting is greatly different from an optimal setting.

For example, there is a small shooting device including no display interface. A shooting device is connected to a display device, and the display device can display a shooting setting of the shooting device. In order to shooting easily or quickly, a shooting setting can be confirmed and shooting can be performed in a state in which a finder device is connected to the shooting device. In this case, it is not necessary for the shooting device to be connected to the display device.

An operation of the camera disclosed in Japanese Unexamined Patent Application, First Publication No. 2000-111994 is the same regardless of whether or not the finder device is mounted.

SUMMARY OF THE INVENTION

According to a first aspect of the present invention, a shooting device includes a shooting module configured to perform shooting to generate an image; a detection unit configured to detect whether or not a finder device is mounted on the shooting device, the finder device being mountable on and detachable from the shooting device and being configured to display an optical image of a subject or an image of the subject output from the shooting module; a storage module configured to store first information and second information, the first information indicating a first operation or a plurality of first operations executable when the finder device is mounted on the shooting device, the second information indicating a plurality of second operations executable when the finder device is not mounted on the shooting device, the first operation or the plurality of the first operations being the same as any a second operation or the plurality of the second operations respectively, and the plurality of the second operations including an operation different from the first operation or any of the plurality of the first operations; and a control unit configured to control a lens module connected to the shooting module to perform the first operation based on the first information when the finder device is detected to be mounted on the shooting device by the detection unit, and control the lens module to perform the second operation based on the second information when the finder device is detected to be not mounted on the shooting device by the detection unit. The first information and the second information are information indicating a range of a parameter used for controlling the lens module, and the parameter is used for controlling an aperture of the lens module. The range indicated by the first information is determined by excluding a partial range in which a depth of field of the lens module is controlled to be shallow from the range indicated by the second information.

According to a second aspect of the present invention, a shooting device includes a shooting module configured to perform shooting to generate an image; a detection unit configured to detect whether or not a finder device is mounted on the shooting device, the finder device being mountable on and detachable from the shooting device and being configured to display an optical image of a subject or an image of the subject output from the shooting module; a storage module configured to store first information and second information, the first information indicating a first operation or a plurality of first operations executable when the finder device is mounted on the shooting device, the second information indicating a plurality of second operations executable when the finder device is not mounted on the shooting device, the first operation or the plurality of the first operations being the same as any a second operation or the plurality of the second operations respectively, and the plurality of the second operations including an operation different from the first operation or any of the plurality of the first operations; and a control unit configured to control a lens module connected to the shooting module to perform the first operation based on the first information when the finder device is detected to be mounted on the shooting device by the detection unit, and control the lens module to perform the second operation based on the second information when the finder device is detected to be not mounted on the shooting device by the detection unit. The first information and the second information are information indicating a range of a parameter used for controlling the lens module, and the parameter is used for controlling an angle of view of the lens module. The range indicated by the first information is determined by excluding a partial range corresponding to a telephoto side of the lens module from the range indicated by the second information.

According to a third aspect of the present invention, a shooting method includes a step of detecting whether or not a finder device is mounted on a shooting device, the finder device being mountable on and detachable from the shooting device and being configured to display an optical image of a subject or an image of the subject output from a shooting module that is configured to perform shooting to generate the image; and a step of controlling a lens module connected to the shooting module to perform a first operation based on first information when the finder device is detected to be mounted on the shooting device by the detection unit, and controlling the lens module to perform a second operation based on second information when the finder device is detected to be not mounted on the shooting device by the detection unit. The first information indicates a first operation or a plurality of first operations executable when the finder device is mounted on the shooting device, and the second information indicates a plurality of second operations executable when the finder device is not mounted on the shooting device. The first operation or the plurality of the first operations are the same as any a second operation or the plurality of the second operations respectively, and the plurality of the second operations include an operation different from the one first operation or any of the plurality of the first operations. The first information and the second information are information indicating a range of a parameter used for controlling an aperture of the lens module. The range indicated by the first information is determined by excluding a partial range in which a depth of field of the lens module is controlled to be shallow from the range indicated by the second information.

According to a fourth aspect of the present invention, a shooting method includes a step of detecting whether or not a finder device is mounted on a shooting device, the finder device being mountable on and detachable from the shooting device and being configured to display an optical image of a subject or an image of the subject output from a shooting module that is configured to perform shooting to generate the image; and a step of controlling a lens module connected to the shooting module to perform a first operation based on first information when the finder device is detected to be mounted on the shooting device by the detection unit, and controlling the lens module to perform a second operation based on second information when the finder device is detected to be not mounted on the shooting device by the detection unit. The first information indicates a first operation or a plurality of first operations executable when the finder device is mounted on the shooting device, and the second information indicates a plurality of second operations executable when the finder device is not mounted on the shooting device. The first operation or the plurality of the first operations are the same as any a second operation or the plurality of the second operations respectively, and the plurality of the second operations include an operation different from the one first operation or any of the plurality of the first operations. The first information and the second information are information indicating a range of a parameter used for controlling an angle of view of the lens module. The range indicated by the first information is determined by excluding a partial range corresponding to a telephoto side of the lens module from the range indicated by the second information.

According to a fifth aspect of the present invention, a non-transitory computer readable recording medium stores a program for causing a computer of a shooting device on which a finder device is mountable to execute: a step of detecting whether or not a finder device is mounted on a shooting device, the finder device being mountable on and detachable from the shooting device and being configured to display an optical image of a subject or an image of the subject output from a shooting module that is configured to perform shooting to generate the image; and a step of controlling a lens module connected to the shooting module to perform a first operation based on first information when the finder device is detected to be mounted on the shooting device by the detection unit, and controlling the lens module to perform a second operation based on second information when the finder device is detected to be not mounted on the shooting device by the detection unit. The first information indicates a first operation or a plurality of first operations executable when the finder device is mounted on the shooting device, and the second information indicates a plurality of second operations executable when the finder device is not mounted on the shooting device. The first operation or the plurality of the first operations are the same as any a second operation or the plurality of the second operations respectively, and the plurality of the second operations include an operation different from the one first operation or any of the plurality of the first operations. The first information and the second information are information indicating a range of a parameter used for controlling an aperture of the lens module. The range indicated by the first information is determined by excluding a partial range in which a depth of field of the lens module is controlled to be shallow from the range indicated by the second information.

According to a sixth aspect of the present invention, a non-transitory computer readable recording medium stores a program for causing a computer of a shooting device on which a finder device is mountable to execute: a step of detecting whether or not a finder device is mounted on a shooting device, the finder device being mountable on and detachable from the shooting device and being configured to display an optical image of a subject or an image of the subject output from a shooting module that is configured to perform shooting to generate the image; and a step of controlling a lens module connected to the shooting module to perform a first operation based on first information when the finder device is detected to be mounted on the shooting device by the detection unit, and controlling the lens module to perform a second operation based on second information when the finder device is detected to be not mounted on the shooting device by the detection unit. The first information indicates a first operation or a plurality of first operations executable when the finder device is mounted on the shooting device, and the second information indicates a plurality of second operations executable when the finder device is not mounted on the shooting device. The first operation or the plurality of the first operations are the same as any a second operation or the plurality of the second operations respectively, and the plurality of the second operations include an operation different from the one first operation or any of the plurality of the first operations. The first information and the second information are information indicating a range of a parameter used for controlling an angle of view of the lens module. The range indicated by the first information is determined by excluding a partial range corresponding to a telephoto side of the lens module from the range indicated by the second information.

BRIEF DESCRIPTION OF DRAWINGS

FIG. 8 is a reference diagram showing first information and second information in a first example of the second embodiment of the present invention.

FIG. 9 is a reference diagram showing first information and second information in a second example of the second embodiment of the present invention.

FIG. 10 is a reference diagram showing first information and second information in a third example of the second embodiment of the present invention.

FIG. 11 is a reference diagram showing first information and second information in a fourth example of the second embodiment of the present invention.

FIG. 12 is a reference diagram showing first information and second information in a fifth example of the second embodiment of the present invention.

FIG. 13 is a reference diagram showing first information and second information in a sixth example of the second embodiment of the present invention.

FIG. 14 is a reference diagram showing first information and second information in a seventh example of the second embodiment of the present invention.

FIG. 15 is a reference diagram showing first information and second information in a modification example of the second embodiment of the present invention.

FIG. 16 is a reference diagram showing first information and second information in an eighth example of the second embodiment of the present invention.

DETAILED DESCRIPTION OF THE INVENTION

Embodiments of the present invention will be described with reference to the drawings.

First Embodiment

Figure 1:
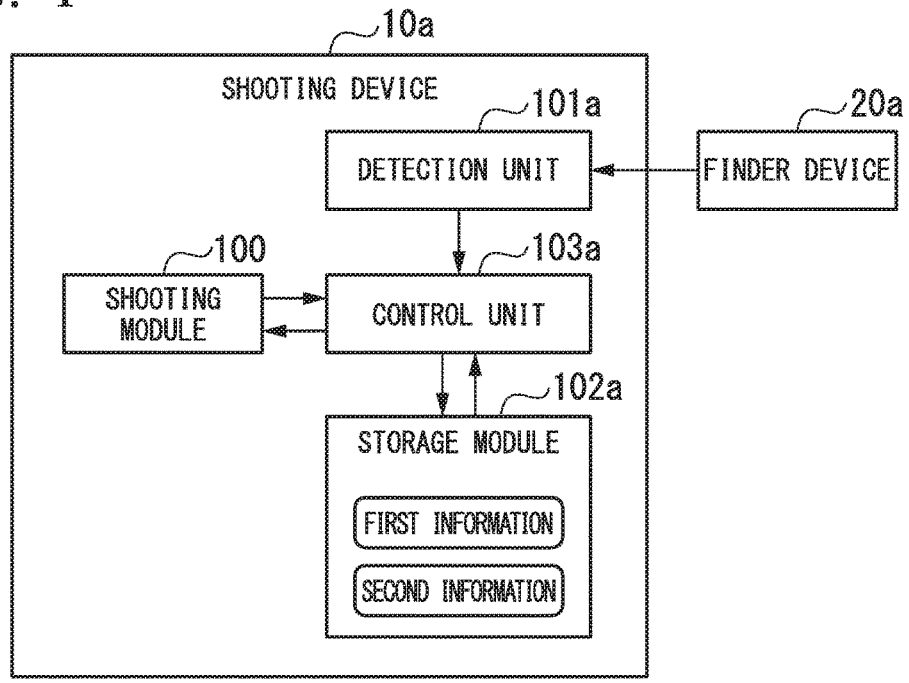
FIG. 1 is a block diagram showing a configuration of a shooting device of a first embodiment of the present invention.

FIG. 1 shows a configuration of a shooting device 10a according to a first embodiment of the present invention. As shown in FIG. 1, the shooting device 10a includes a shooting module 100, a detection unit 101a, a storage module 102a, and a control unit 103a.

The shooting module 100 performs shooting to generate an image (image data).

The detection unit 101a detects whether or not a finder device 20a is mounted on the shooting device 10a. For example, the detection unit 101a may detect mechanically whether or not the finder device 20a is mounted on the shooting device 10a. The detection unit 101a may detect electrically whether or not the finder device 20a is mounted on the shooting device 10a. The finder device 20a displays an optical image of a subject or an image of the subject output from the shooting module 100. The finder device 20a can be mounted on and detached from the shooting device 10a. The finder device 20a may be either an optical finder or an electronic finder. If the finder device 20a is an electronic finder, the finder device 20a displays an image generated by the shooting module 100.

The storage module 102a stores first information and second information. The storage module 102a is a volatile or nonvolatile recording medium. The first information indicates a first operation or a plurality of first operations that are executable when the finder device 20a is mounted on the shooting device 10a. The second information indicates a plurality of second operations that are executable when the finder device 20a is not mounted on the shooting device 10a. One first operation or the plurality of the first operations are the same as any a second operation or the plurality of the second operations, respectively. The plurality of the second operations include the same operation as a first operation or a plurality of first operations. The plurality of the second operations may include an operation different from the one first operation or any one of the plurality of first operations. A first operation or a plurality of first operations are included in the plurality of the second operations. The first operation and the second operation are operations used for controlling a state of the shooting module 100 or a state of the lens module connected to the shooting module 100.

The first information or the second information is at least one of information on a shooting mode, information on a control algorithm, information on an operation for setting a specific shooting parameter, and information on a single shooting or consecutive shootings. According to the first operation, it is easy to decrease a degree of difference between a shooting setting such as a focus or the like and an optimal setting on average in comparison with that of the second operation.

When it is detected that the finder device 20a is mounted on the shooting device 10a, the control unit 103a controls the shooting module 100 or the lens module connected to the shooting module 100 such that the first operation based on the first information is performed. When it is detected that the finder device 20a is not mounted on the shooting device 10a, the control unit 103a controls the shooting module 100 or the lens module connected to the shooting module 100 such that the second operation based on the second information is performed. When it is detected that the finder device 20a is mounted on the shooting device 10a, the control unit 103a limits executable operations such that the number of executable operations is smaller than that when the finder device 20a is not mounted on the shooting device 10a.

A computer of the shooting device 10a may read the program including instructions defining the operations of the detection unit 101a and the control unit 103a and execute the read program. Functions of the detection unit 101a and the control unit 103a may be realized by software. This program may be provided by a "non-transitory computer-readable recording medium" such as a flash memory. Further, the above-described program may be transmitted from the computer having a storage device or the like in which the program is stored to the shooting device 10a via the transmission medium or transmission waves in the transmission medium. The "transmission medium" for transmitting the program is a medium having a function of transmitting information, such as a network (communication network) such as the Internet or a communication line such as a telephone line. Further, the above-described program may realize some of the above-described functions. Further, the above-described program may be a so-called differential file (a differential program) capable of realizing the above-described functions in combination with a program previously recorded in a computer.

Figure 2:
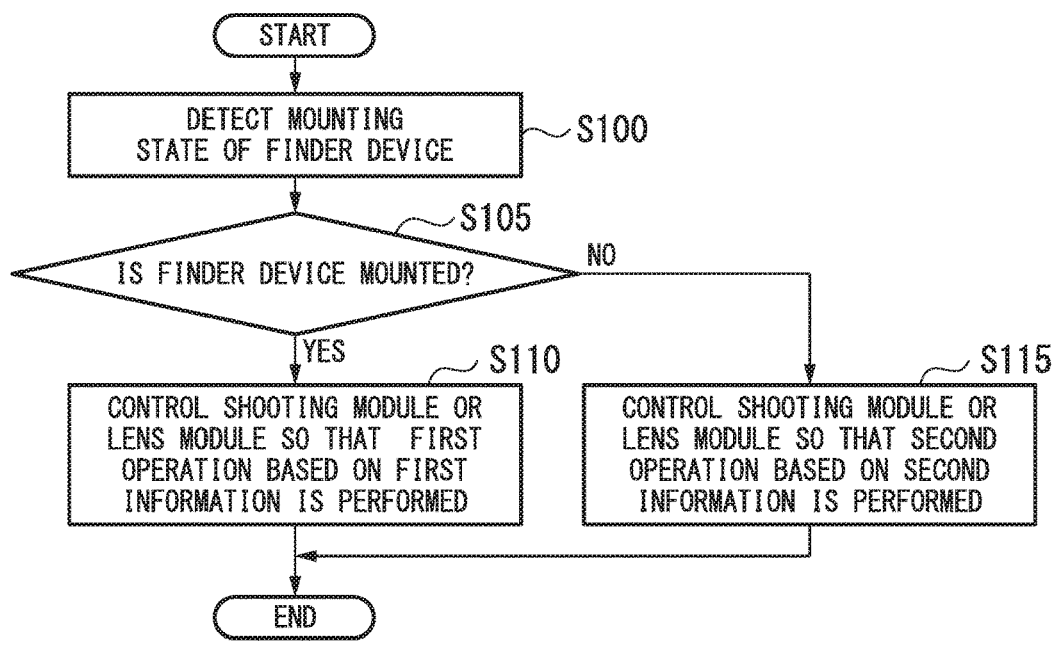
FIG. 2 is a flowchart showing a procedure of an operation of a shooting device of a first embodiment of the present invention.

FIG. 2 shows a procedure of an operation of the shooting device 10a regarding control of shooting. The operation of the shooting device 10a regarding the control of shooting will be described with reference to FIG. 2. For example, the operation shown in FIG. 2 is performed when a power supply of the shooting device 10a transitions from OFF to ON, that is, when the shooting device 10a starts up.

The detection unit 101a detects a mounting state of the finder device 20a with respect to the shooting device 10a (step S100). In step S100, the detection unit 101a detects whether or not the finder device 20a is mounted on the shooting device 10a. After the mounting state of the finder device 20a is detected, the detection unit 101a determines whether or not the finder device 20a is mounted on the shooting device 10a on the basis of the mounting state of the finder device 20a detected in step S100 (step S105).

When the finder device 20a is mounted on the shooting device 10a, the control unit 103a reads first information from the storage module 102a. The control unit 103a controls the shooting module 100 or the lens module such that a first operation based on the read first information is performed (step S110). In step S110, the shooting module 100 or the lens module performs the first operation according to control of the control unit 103a. When the finder device 20a is an electronic finder, the finder device 20a displays an image generated by the shooting module 100 before the first operation is performed.

When the finder device 20a is not mounted on the shooting device 10a, the control unit 103a reads second information from the storage module 102a. The control unit 103a controls the shooting module 100 or the lens module such that a second operation based on the read second information is performed (step S115). In step S115, the shooting module 100 or the lens module performs the second operation according to control of the control unit 103a.

In step S110, if there are a plurality of first operations selectable on the basis of the first information, a first operation is selected using the following method. For example, when a first operation is selected in advance and setting information indicating the selected a first operation is stored in the storage module 102a, the control unit 103a selects a first operation on the basis of the setting information. For example, the setting information may indicate a first operation set by default in the shooting device 10a. The setting information may indicate a first operation selected by the user in advance. The setting information may indicate a first operation selected when the shooting device 10a was previously used and the process of step S110 was performed. When the shooting module 100 enters a state in which shooting is possible, the control unit 103a may acquire the image from the shooting module 100 and select a first operation on the basis of a state of the acquired image. The setting information may indicate a first operation selected on the basis of the state of the image. In step S115, when there are a plurality of second operations selectable on the basis of the second information, a second operation may be selected using the same method as the above method.

After the above described process is performed, the operation of the shooting device 10a regarding the control of shooting ends. For example, after the first operation or the second operation is performed, the shooting module 100 performs shooting to generate a still image. The first operation and the second operation may include an operation of performing shooting to generate a still image.

The operation shown in FIG. 2 may be performed at a timing other than a timing when a power supply of the shooting device 10a transitions from OFF to ON. For example, the operation shown in FIG. 2 may be performed after the shooting device 10a starts up. The operation shown in FIG. 2 may be repeatedly performed. For example, the detection of the mounting state of the finder device 20a may be periodically performed and, when the mounting state of the finder device 20a has changed, the first operation or the second operation may be performed according to the mounting state of the finder device 20a.

According to the first embodiment, the shooting device 10a is configured by including the shooting module 100, the detection unit 101a, the storage module 102a, and the control unit 103a.

According to the first embodiment, a shooting method including step S100, step S110, or step S115 is configured. In step S100, it is detected whether or not the finder device 20a is mounted on the shooting device 10a. In step S110, if it is detected that the finder device 20a is mounted on the shooting device 10a, the shooting module 100 or the lens module connected to the shooting module 100 is controlled such that the first operation based on the first information is performed. In step S115, when it is detected that the finder device 20a is not mounted on the shooting device 10a, the shooting module 100 or the lens module is controlled such that the second operation based on the second information is performed.

According to the first embodiment, a program that causes a computer of the shooting device 10a to execute step S100, step S110, or step S115 is configured.

In the first embodiment, when the finder device 20a is mounted on the shooting device 10a, executable operations are limited in comparison with a case in which the finder device 20a is not mounted on the shooting device 10a. In the first operation, it is easy for a degree of difference between a shooting setting of a focus or the like and an optimal setting to be averagely reduced in comparison with that in the second operation. Therefore, it is possible to reduce a degree of difference between the setting of the shooting and an optimal setting. When the finder device 20a is mounted on the shooting device 10a, it is easy for the shooting module 100 to succeed in capturing of an image preferred by the user.

Second Embodiment

Figure 3:
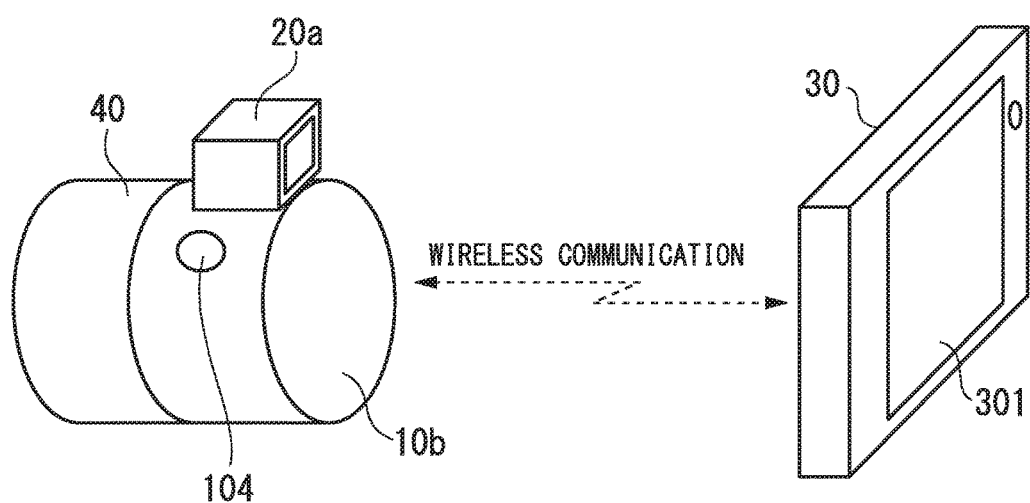
FIG. 3 is a block diagram showing a configuration of a shooting system of a second embodiment of the present invention.

FIG. 3 shows a configuration of a shooting system 1 of a second embodiment of the present invention. As shown in FIG. 3, the shooting system 1 includes a shooting device 10b, a finder device 20a, a display device 30, and a lens module 40.

The shooting device 10b includes a shooting operation switch 104. The shooting operation switch 104 is arranged on a surface of the shooting device 10b. The shooting device 10b performs wireless communication with the display device 30. The finder device 20a is mounted on the surface of the shooting device 10b. The display device 30 performs wireless communication with the shooting device 10b. The display device 30 includes a display module 301. The display module 301 is arranged on a surface of the display device 30.

The lens module 40 includes a lens such as a focus lens or a zoom lens. In FIG. 3, the lens module 40 is mounted on the shooting device 10b. The shooting device 10b and the lens module 40 can be separated. The shooting device 10b may include the lens module.

Figure 4:
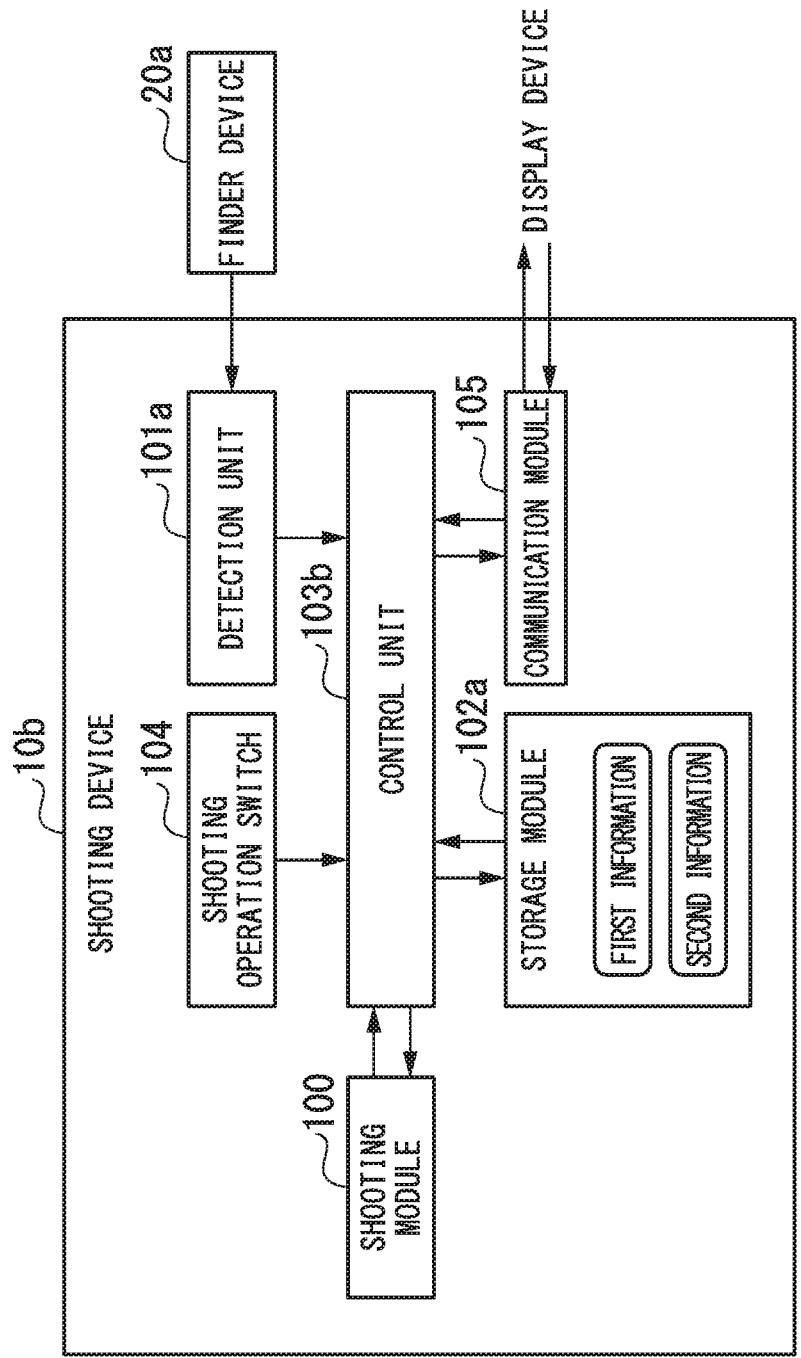
FIG. 4 is a block diagram showing a configuration of a shooting device of the second embodiment of the present invention.

FIG. 4 shows a configuration of the shooting device 10b. As shown in FIG. 4, the shooting device 10b includes a shooting module 100, a detection unit 101a, a storage module 102a, a control unit 103b, a shooting operation switch 104, and a communication module 105. The shooting device of each aspect of the present invention may not have a configuration corresponding to at least one of the shooting operation switch 104 and the communication module 105.

A difference between the configuration shown in FIG. 4 and the configuration shown in FIG. 1 will be described. The shooting operation switch 104 receives a shooting instruction operation. For example, the shooting instruction may be an instruction to acquire a still image. For example, the shooting operation switch 104 may receive an operation from the user when the shooting operation switch 104 is brought into contact with a portion of a body of a user. The shooting operation switch 104 outputs a signal according to the operation to the control unit 103*b* upon receiving the operation. A shape and a structure of the shooting operation switch 104 are arbitrary. For example, the shooting operation switch 104 is a shutter button.

The communication module 105 performs wireless communication with the display device 30. The communication module 105 wirelessly transmits the image generated by the shooting module 100 to the display device 30. Further, the communication module 105 wirelessly receives instruction information indicating a shooting instruction from the display device 30.

When it is detected that the finder device 20*a* is mounted on the shooting device 10*b* and a shooting instruction operation is received by the shooting operation switch 104, the control unit 103*b* controls the shooting module 100 or the lens module 40 connected to the shooting module 100 such that the first operation based on the first information is performed. When it is detected that the finder device 20*a* is not mounted on the shooting device 10*b* and the shooting instruction operation is received by the shooting operation switch 104, the control unit 103*b* controls the shooting module 100 or the lens module 40 connected to the shooting module 100 such that the second operation based on the second information is performed.

For example, the control unit 103*b* reads a program including an instruction that defines the operation of the control unit 103*b*, and executes the read program. A realization form of this program is the same as the realization form of the program for realizing the function of the control unit 103*a* shown in FIG. 1.

A configuration shown in FIG. 4 is the same as that shown in FIG. 1 except for the above-mentioned points.

Figure 5:
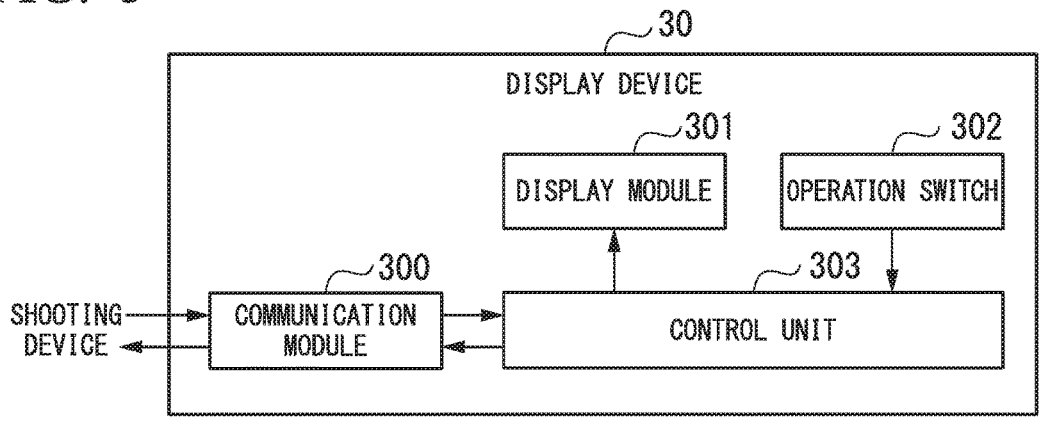
FIG. 5 is a block diagram showing a configuration of a display device of the second embodiment of the present invention.

FIG. 5 shows a configuration of the display device 30. As shown in FIG. 5, the display device 30 includes a communication module 300, a display module 301, an operation switch 302, and a control unit 303.

The communication module 300 performs wireless communication with the shooting device 10*b*. The communication module 300 wirelessly receives an image generated by the shooting module 100 of the shooting device 10*b* from the shooting device 10*b*. Further, the communication module 300 wirelessly transmits instruction information indicating a shooting instruction to the shooting device 10*b*.

The display module 301 displays the image wirelessly received by the communication module 300.

The operation switch 302 receives a shooting instruction operation. For example, the shooting instruction is an instruction to acquire a still image. For example, when the operation switch 302 is brought into contact with a portion of a body of a user, the operation switch 302 receives an operation from the user. When the operation switch 302 receives the operation, the operation switch 302 outputs a signal according to the operation to the control unit 303. A shape and a structure of the operation switch 302 are arbitrary. For example, the operation switch 302 is a button. When the display module 301 is a touch panel, the operation switch 302 may be included in the display module 301.

When the shooting instruction operation is received by the operation switch 302, the control unit 303 generates instruction information indicating a shooting instruction.

Figure 6:
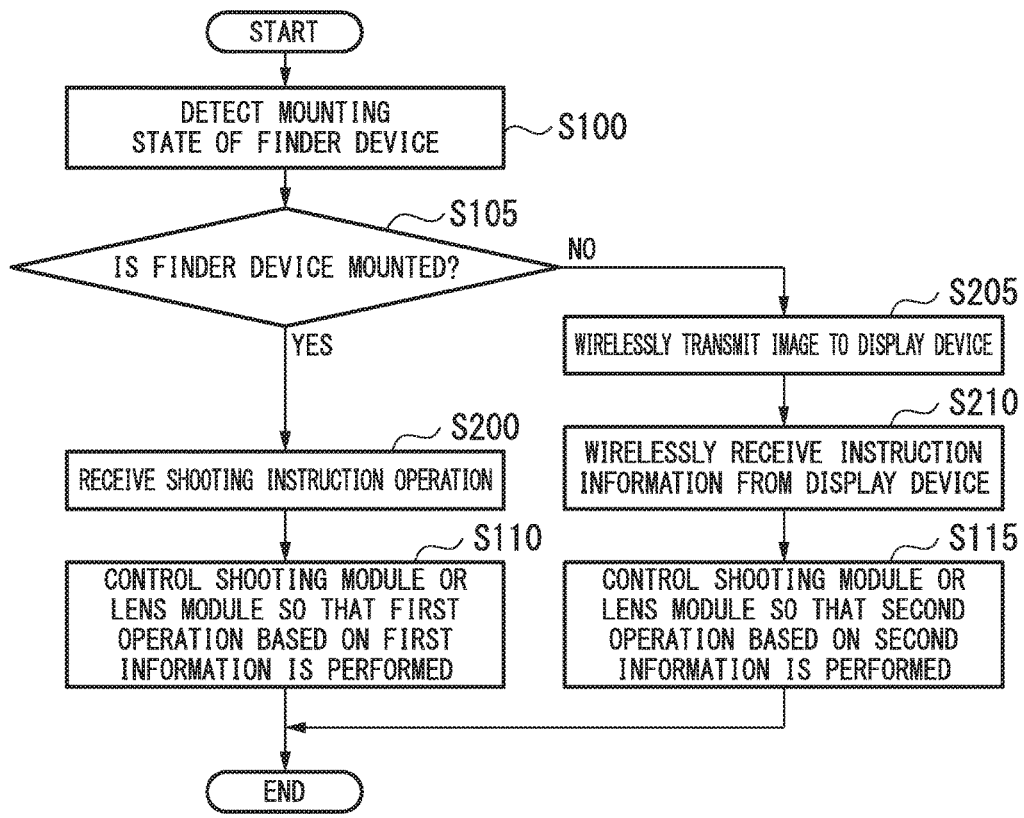
FIG. 6 is a flowchart showing a procedure of an operation of a shooting device of a second embodiment of the present invention

FIG. 6 shows a procedure of an operation of the shooting device 10*b* regarding control of shooting. The operation of the shooting device 10*b* regarding control of shooting will be described with reference to FIG. 6. A difference between the process shown in FIG. 6 and the process shown in FIG. 2 will be described.

If the finder device 20*a* is mounted on the shooting device 10*b* in step S105, the shooting operation switch 104 receives a shooting instruction operation (step S200). After the shooting instruction operation is received, the process of step S110 is performed.

If the finder device 20*a* is not mounted on the shooting device 10*b* in step S105, the control unit 103*b* outputs the image generated by the shooting module 100 to the communication module 105. The communication module 105 wirelessly transmits the image to the display device 30 (step S205). For example, the image transmitted to the display device 30 is a moving image (live image) including images of a plurality of frames.

After the image is wirelessly transmitted to the display device 30, the communication module 105 wirelessly receives the instruction information indicating a shooting instruction from the display device 30 (step S210). The instruction information received by the communication module 105 is output to the control unit 103*b*. After the instruction information is wirelessly received from the display device 30, a process of step S115 is performed.

The process shown in FIG. 6 is the same as the process shown in FIG. 2 except for the above-mentioned points.

Figure 7:
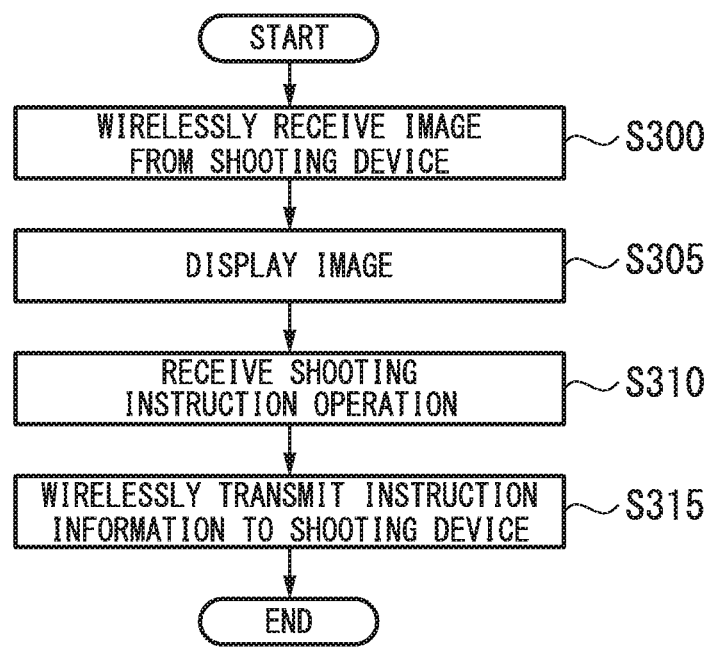
FIG. 7 is a flowchart showing a procedure of an operation of a display device of the second embodiment of the present invention.

FIG. 7 shows a procedure of an operation of the display device 30 regarding a display of an image and control of shooting. The operation of the display device 30 regarding a display of an image and control of shooting will be described with reference to FIG. 7.

The communication module 300 wirelessly receives the image from the shooting device 10*b* (step S300). The image wirelessly received by the communication module 300 is output to the display module 301 via the control unit 303. The display module 301 displays the image (step S305). The user can perform confirmation of setting of the shooting by confirming the displayed image.

After the image is displayed, the operation switch 302 receives a shooting instruction operation (step S310). After the shooting instruction operation is received, the control unit 303 generates instruction information indicating a shooting instruction. The generated instruction information is output to the communication module 300. The communication module 300 wirelessly transmits the instruction information to the shooting device 10*b* (step S315).

After the above process is performed, the operation of the display device 30 regarding the display of the image and the control of the shooting ends.

As shown in the description of the first embodiment, the first operation previously selected by the user among the plurality of the first operations based on the first information may be selected in step S110. For example, the control unit 103*b* of the shooting device 10*b* reads the first information from the storage module 102*a*. The communication module 105 wirelessly transmits the read first information to the display device 30. The communication module 300 of the display device 30 wirelessly receives the first information from the shooting device 10*b*. The display module 301 displays the plurality of the first operations that can be executed by the shooting device 10*b* on the basis of the first information that has been wirelessly received. The operation switch 302 receives an operation for selecting any one of the plurality of the first operations displayed by the display module 301. The control unit 303 generates first operation information indicating the selected first operation. The communication module 300 wirelessly transmits the generated first operation information to the shooting device 10b.

The communication module 105 of the shooting device 10b wirelessly receives the first operation information from the display device 30. The control unit 103b stores setting information corresponding to the first operation indicated by the wirelessly received first operation information in the storage module 102a. In step S110, the control unit 103b selects the first operation designated by the setting information among the plurality of the first operations indicated by the first information.

As shown in the description of the first embodiment, the second operation previously selected by the user among the plurality of the second operations based on the second information may be selected in step S115. The description of this case is the same as the above description regarding the first operation.

When the finder device 20a is not mounted on the shooting device 10b, the user can confirm the setting of the shooting by confirming the image displayed on the display module 301 of the display device 30. When the shooting device 10b and the display device 30 are connected by wireless communication, it takes time to establish a connection for wireless communication. When the finder device 20a is mounted on the shooting device 10b, it is not necessary for the shooting device 10b to be connected to the display device 30. Therefore, shooting can be performed easily or quickly. When the finder device 20a is mounted on the shooting device 10b, confirmation of the setting of the shooting is performed through confirmation of an optical image or an image of the subject displayed by the finder device 20a. In this case, by limiting an executable operation, a degree of difference between the setting of shooting and an optimal setting is reduced. It is easy for the shooting module 100 to succeed in capturing of an image preferred by the user.

First Example of Second Embodiment

FIG. 8 shows first information A11 and second information A12 in a first example of the second embodiment. The first information A11 corresponds to a case in which the finder device 20a is mounted. The second information A12 corresponds to a case in which the finder device 20a is not mounted. The first information A11 and the second information A12 include information on a shooting mode.

The first information A11 includes information on a plurality of first operations. The second information A12 includes information on a plurality of second operations. The first operation and the second operation are operations of a mode in which at least one of shutter speed and an aperture is controlled. Specifically, the plurality of the first operations are a fully automatic mode and a programmable automatic mode. Specifically, the plurality of the second operations are a fully automatic mode, a programmable automatic mode, a shutter speed priority mode, an aperture priority mode, and a manual mode. The fully automatic mode and the programmable automatic mode are common to the first operation and the second operation. The first information A11 may include information on only any one of the fully automatic mode and the programmable automatic mode.

The fully automatic mode is a mode in which the shooting device 10b automatically sets a shooting mode optimal for a scene. In the fully automatic mode, the shooting mode optimal for the scene is determined, and a shutter speed value and an aperture value corresponding to the shooting mode are set in the shooting module 100. The programmable auto is a mode in which a shutter speed value and an aperture value suitable for a main subject in an image are automatically set. The shutter speed priority mode is a mode in which an aperture value is set such that exposure is appropriate on the basis of a shutter speed value designated by a user. The aperture priority mode is a mode in which a shutter speed value is set such that exposure is appropriate on the basis of an aperture value designated by a user. The manual mode is a mode in which a shutter speed value and an aperture value designated by a user are set.

When the shutter speed value and the aperture value set in the shooting module 100 does not match the shutter speed value and the aperture value suitable for shooting of the main subject, it is easy for the shooting module 100 to fail in capturing of an image preferred by the user. It is easy for an image in which the main subject is very dark or bright to be captured. The plurality of the first operations include only a shooting mode in which a user does not designate a shooting parameter. The plurality of the first operations do not include a shooting mode in which a user designates a shooting parameter.

For example, if the finder device 20a is mounted on the shooting device 10b, one of the two first operations is selected using the following method. When the shooting module 100 enters a state in which shooting is possible, the control unit 103b acquires the image from the shooting module 100. The control unit 103b determines a scene on the basis of a state of the acquired image. If an optimal scene can be determined, the control unit 103b selects the fully automatic mode. The control unit 103b sets a mode of the shooting module 100 to the fully automatic mode such that shooting is performed in the fully automatic mode. If an optimal scene cannot be determined, the control unit 103b selects a programmable mode. The control unit 103b sets the mode of the shooting module 100 to the programmable mode such that shooting is performed in the programmable mode.

In the first example of the second embodiment, when the finder device 20a is mounted on the shooting device 10b, shooting is performed in a shooting mode in which the user does not designate a shooting parameter. Therefore, it is possible to reduce a degree of difference between the setting of the shooting and an optimal setting. It is easy for the shooting module 100 to succeed in capturing of an image preferred by the user.

Second Example of Second Embodiment

FIG. 9 shows first information A21 and second information A22 in a second example of the second embodiment. The first information A21 corresponds to a case in which the finder device 20a is mounted. The second information A22 corresponds to a case in which the finder device 20a is not mounted. The first information A21 and the second information A22 include information on a focus control algorithm.

The first information A21 includes information on a plurality of first operations. The second information A22 includes information on a plurality of second operations. The first operation and the second operation are operations for controlling the focus. Specifically, a plurality of first operations are a face priority algorithm, and a single AF algorithm in which a center is a target. Specifically, a plurality of second operations are a face priority algorithm, a single AF algorithm in which a center is a target, a continuous AF algorithm, and a manual algorithm. The face priority algorithm and the single AF algorithm in which a center is a target are common to the first operation and the second operation. The first information A21 may include only any one of the face priority algorithm and the single AF algorithm in which a center is a target.

The face priority algorithm is an algorithm for focusing on a face recognized from an image through a face recognition function. The single AF algorithm in which a center is a target is an algorithm for focusing on a subject at a center of an image at one time. The continuous AF algorithm is an algorithm for continuously focusing on a moving subject. The manual algorithm is an algorithm for setting a focus designated by the user.

If a focus does not match the main subject, it is easy for the shooting module 100 to fail in capturing of an image preferred by the user. It is easy for an image in which the focus is blurred to be captured. The plurality of the first operations include only a focus control algorithm with which it is easy for a focus suitable for a case in which there is no accompanying confirmation of a subject to be set. The plurality of the first operations do not include a focus control algorithm with which it is difficult for the focus suitable for a case in which there is no accompanying confirmation of a subject to be set.

For example, if the finder device 20a is mounted on the shooting device 10b, one of the two first operations is selected using the following method. When the shooting module 100 enters a state in which shooting is possible, the control unit 103b acquires the image from the shooting module 100. The control unit 103b determines whether or not there is a person in the acquired image. If there is a person in the image, the control unit 103b selects the face priority algorithm. The control unit 103b controls the lens module 40 such that shooting is performed in a state in which a focus is set according to the face priority algorithm. If there is no person in the image, the control unit 103b selects the single AF algorithm in which a center is a target. The control unit 103b controls the lens module 40 such that shooting is performed in a state in which a focus is set according to the single AF algorithm in which a center is a target.

In a second example of the second embodiment, when the finder device 20a is mounted on the shooting device 10b, shooting is performed according to a focus control algorithm in which it is easy for an appropriate focus to be set. Therefore, it is possible to reduce a degree of difference between the setting of the shooting and an optimal setting. It is easy for the shooting module 100 to succeed in capturing of an image preferred by the user.

Third Example of Second Embodiment

FIG. 10 shows first information A31 and second information A32 in a third example of the second embodiment. The first information A31 corresponds to a case in which the finder device 20a is mounted. The second information A32 corresponds to a case in which the finder device 20a is not mounted. The first information A31 and the second information A32 include information on an operation in which a specific shooting parameter (focus parameter) is set.

The first information A31 includes information on a plurality of first operations. The second information A32 includes information on a plurality of second operations. The first operation and the second operation are operations in which a specific shooting parameter (focus parameter) is set. In the example shown in FIG. 10, the lens module 40 in which the aperture value of the lens can be set in a range of F3.5 to F22 is used. Specifically, the plurality of the first operations are operations in which the aperture value of the lens of the lens module 40 is set to any one of F5.6 to F22. Specifically, the plurality of the second operations are operations in which the aperture value of the lens of the lens module 40 is set to any one of F3.5 to F22. The operation in which the aperture value of the lens of the lens module 40 is set to any one of F5.6 to F22 is common to the first operation and the second operation. In the example shown in FIG. 10, a plurality of aperture values of the lens of the lens module 40 can be set in the range of F5.6 to F22 and the range of F3.5 to F22. Therefore, the shooting device 10b is capable of executing a plurality of first operations and a plurality of second operations in which a specific shooting parameter is set.

If a focus does not match the main subject, it is easy for the shooting module 100 to fail in capturing of an image preferred by the user. It is easy for an image in which the focus is blurred to be captured. By changing the aperture value of the lens of the lens module 40, a range of focusing (depth of field) is extended. Accordingly, it is possible to prevent shooting of an image in which a focus is blurred. The plurality of the first operations includes only an operation for setting an aperture value at which a depth of field is relatively wide. The plurality of the first operations do not include an operation for setting an aperture value at which the depth of field is relatively narrow.

For example, if the finder device 20a is mounted on the shooting device 10b, one of the plurality of the first operations is selected using the following method. When the shooting module 100 enters a state in which shooting is possible, the control unit 103b continuously acquires the image from the shooting module 100. For example, an aperture value of the lens of the lens module 40 is initially set to F5.6. The control unit 103b calculates an edge component of the image. If a value of the calculated edge component is less than a threshold value, the control unit 103b changes the aperture value of the lens of the lens module 40 to a greater value. After the aperture value of the lens of the lens module 40 is changed, the control unit 103b calculates the edge component of the image again. This operation is repeated until the value of the edge components is equal to or greater than the threshold value. The control unit 103b controls the lens module 40 such that the shooting is performed in a state in which the aperture value of the lens of the lens module 40 is equal to or greater than F5.6.

In the third example of the second embodiment, when the finder device 20a is mounted on the shooting device 10b, the aperture value at which a depth of field is relatively wide is set and shooting is performed. Therefore, it is possible to reduce a degree of difference between the setting of the shooting and an optimal setting. It is easy for the shooting module 100 to succeed in capturing of an image preferred by the user.

Fourth Example of Second Embodiment

FIG. 11 shows first information A41 and second information A42 in a fourth example of the second embodiment. The first information A41 corresponds to a case in which the finder device 20a is mounted. The second information A42 corresponds to a case in which the finder device 20a is not mounted. The first information A41 and the second information A42 include information on an exposure control algorithm.

The first information A41 includes information on a plurality of first operations. The second information A42 includes information on a plurality of second operations. The first operation and the second operation are operations for controlling exposure. Specifically, the plurality of the first operations are a center-weighted average metering algorithm, and a face priority algorithm. Specifically, the plurality of the second operations are the center-weighted average metering algorithm, the face priority algorithm, and a spot metering algorithm. The center-weighted average metering algorithm and the face priority algorithm are common to the first operation and the second operation. The first information A41 may include information on only any one of the center-weighted average metering algorithm and the face priority algorithm.

The center-weighted average metering algorithm is an algorithm that detects brightness of an entire image while mainly detecting brightness of a central portion of the image and controls exposure on the basis of the detected brightness. The face priority algorithm is an algorithm that controls exposure such that brightness of a face recognized from an image through a face recognition function is optimized. The spot metering algorithm is an algorithm that controls exposure such that brightness of only the vicinity of a focus point of an image is optimized.

If brightness of a main subject is not appropriate, it is easy for the shooting module 100 to fail in capturing of an image preferred by the user. It is easy for an image in which the main subject is very dark or bright to be captured. The plurality of the first operations include only an exposure control algorithm with which it is easy for exposure suitable for a case in which no confirmation of a subject is accompanied to be set. The plurality of the first operations do not include an exposure control algorithm with which it is difficult for exposure suitable for a case in which no confirmation of a subject is accompanied to be set.

For example, if the finder device 20a is mounted on the shooting device 10b, one of the two first operations is selected using the following method. When the shooting module 100 enters a state in which shooting is possible, the control unit 103b acquires the image from the shooting module 100. The control unit 103b determines whether or not there is a person in the acquired image. If there is a person in the image, the control unit 103b selects the face priority algorithm. The control unit 103b controls the shooting module 100 such that shooting is performed in a state in which exposure is set according to the face priority algorithm. If there is no person in the image, the control unit 103b selects a center-weighted average metering algorithm. The control unit 103b controls the shooting module 100 such that shooting is performed in a state in which the exposure is set according to the center-weighted average metering algorithm.

In the fourth example of the second embodiment, when the finder device 20a is mounted on the shooting device 10b, shooting is performed according to an exposure control algorithm with which it is easy for appropriate exposure to be set. Therefore, it is possible to reduce a degree of difference between the setting of the shooting and an optimal setting. It is easy for the shooting module 100 to succeed in capturing of an image preferred by the user.

Fifth Example of Second Embodiment

FIG. 12 shows first information A51 and second information A52 in a fifth example of the second embodiment. The first information A51 corresponds to a case in which the finder device 20a is mounted. The second information A52 corresponds to a case in which the finder device 20a is not mounted. The first information A51 and the second information A52 include information on an operation in which a specific shooting parameter (angle of view parameter) is set.

The first information A51 includes information on a plurality of first operations. The second information A52 includes information on a plurality of second operations. The first operation and the second operation are operations in which a specific shooting parameter (angle of view parameter) is set. In the example shown in FIG. 12, the lens module 40 in which the angle of view of the lens can be set in a range of 28 mm to 84 mm in 35 mm conversion is used. The angle of view of 28 mm corresponds to a widest angle state, that is, a wide end. The angle of view of 84 mm corresponds to a most telephoto state, that is, a telephoto end. Specifically, the plurality of the first operations are operations in which the angle of view of the lens of the lens module 40 is set to any one value of 28 mm or more and 36 mm or less. Specifically, the plurality of the second operations are operations in which the angle of view of the lens of the lens module 40 is set to any one of 28 mm to 84 mm. The operation in which the angle of view of the lens of the lens module 40 is set to any one of 28 mm to 36 mm is common to the first operation and the second operation. In the example shown in FIG. 12, a plurality of angles of view of the lens of the lens module 40 can be set in a range of 28 mm to 36 mm and a range of 28 mm to 84 mm. Therefore, the shooting device 10b is capable of executing the plurality of the first operations and the plurality of the second operations in which a specific shooting parameter is set.

When an angle of view corresponding to a high-magnification zoom is set in the lens of the lens module 40, it is easy for the shooting module 100 to fail in capturing of an image preferred by the user. It is easy for an image in which a part or all of the main subject is not within a shooting range to be captured. By changing the angle of view of the lens of the lens module 40, it is possible to set a wider angle of view. Accordingly, it is possible to avoid capturing of an image in which a part or all of the main subject is not within the shooting range. The plurality of the first operations include only an operation in which a relatively wide angle of view is set. The plurality of the first operations do not include an operation in which a relatively telephoto angle of view is set.

For example, if the finder device 20a is mounted on the shooting device 10b, one of a plurality of first operations is selected using the following method. When the shooting module 100 enters a state in which shooting is possible, the control unit 103b continuously acquires the image from the shooting module 100. For example, an angle of view of the lens of the lens module 40 is initially set to 36 mm. The control unit 103b detects a contour of the main subject from the image. If the detected contour intersects with a boundary of a screen, the control unit 103b changes the angle of view of the lens of the lens module 40 to a more telephoto angle of view. After the angle of view of the lens of the lens module 40 is changed, the control unit 103b detects the contour of the main subject from the image again. This operation is repeated until the detected contour does not intersect with the boundary of the screen. The control unit 103b controls the lens module 40 such that the shooting is performed in a state in which the angle of view of the lens of the lens module 40 is less than or equal to 36 mm.

In the fifth example of the second embodiment, when the finder device 20a is mounted on the shooting device 10b, a relatively wide angle of view is set and shooting is performed. Therefore, it is possible to reduce a degree of difference between the setting of the shooting and an optimal setting. It is easy for the shooting module 100 to succeed in capturing of an image preferred by the user.

Sixth Example of Second Embodiment

FIG. 13 shows first information A61 and second information A62 in a sixth example of the second embodiment. The first information A61 corresponds to a case in which the finder device 20a is mounted. The second information A62 corresponds to a case in which the finder device 20a is not mounted. The first information A61 and the second information A62 include information on consecutive shootings are in which each shooting has a different shooting parameter (focus parameter), or a single shooting.

The first information A61 includes information on a first operation. The second information A62 includes information on a plurality of second operations. A first operation is an operation in which consecutive shootings are performed. Specifically, the a first operation is a focus bracket. The plurality of the second operations includes an operation in which consecutive shootings are performed, and an operation in which only a single shooting is performed. Specifically, the plurality of the second operations are a focus bracket and single shooting. The focus bracket is common to the first operation and the second operation.

The focus bracket is an operation in which consecutive shootings, that is, shooting of a plurality of frames is performed while changing a focus parameter, that is, a position of the focus every shooting operation, that is, shooting of a single frame. The single shooting is an operation in which a single shooting, that is, shooting of only a single frame is performed.

If a focus does not match the main subject, it is easy for the shooting module 100 to fail in capturing of an image preferred by the user. It is easy for an image in which the focus is blurred to be captured. Further, it is easy for an optimal focus to be changed according to movement of the main subject and conditions of illumination light. A first operation includes only an operation in which it is easy for an image captured with a focus suitable for a case in which there is no accompanying confirmation of a subject to be acquired. A first operation does not include an operation in which it is difficult for an image captured with a focus suitable for a case in which there is no accompanying confirmation of a subject to be acquired.

When it is detected that the finder device 20a is mounted on the shooting device 10b, the control unit 103b controls the shooting module 100 and the lens module 40 such that the first operation based on the first information is performed. For example, when the finder device 20a is mounted on the shooting device 10b, and the shooting module 100 enters a state in which shooting is possible, the control unit 103b sets a focus of a lens of the lens module 40. After the focus of the lens of the lens module 40 is set, the control unit 103b controls the shooting module 100 such that shooting of a single frame is performed. The control unit 103b performs the setting of the focus of the lens of the lens module 40 and the control of the shooting of a single frame by several times. The focus of the lens of the lens module 40 is different in every shooting of the single frame.

In the sixth example of the second embodiment, when the finder device 20a is mounted on the shooting device 10b, consecutive shootings are performed. At least one of images of a plurality of frames acquired by the consecutive shootings may be an image captured with an optimal setting. Therefore, it is possible to reduce a degree of difference between the setting of the shooting and an optimal setting. It is easy for the shooting module 100 to succeed in capturing of an image preferred by the user.

Seventh Example of Second Embodiment

FIG. 14 shows first information A71 and second information A72 in a seventh example of the second embodiment. The first information A71 corresponds to a case in which the finder device 20a is mounted. The second information A72 corresponds to a case in which the finder device 20a is not mounted. The first information A71 and the second information A72 include information on consecutive shootings in which shooting parameters (exposure parameters) are different or a single shooting.

The first information A71 includes information on a plurality of first operations. The second information A72 includes information on a plurality of second operations. The plurality of the first operations are an operation in which consecutive shootings are performed. Specifically, the plurality of the first operations are an exposure bracket, an International Organization for Standardization (ISO) bracket, and a High Dynamic Range (HDR) bracket. The plurality of the second operations include an operation in which consecutive shootings performed, and an operation in which only a single shooting is performed. Specifically, the plurality of the second operations include an exposure bracket, an ISO bracket, an HDR bracket, and single shooting. The exposure bracket, the ISO bracket, and the HDR bracket are common to the first operation and the second operation. The first information A71 may include information on only any one of the exposure bracket, the ISO bracket, and the HDR bracket.

The exposure bracket is an operation in which consecutive shootings, that is, shootings of a plurality of frames are performed while changing an exposure parameter, that is, a value of exposure in every shooting of a single frame. The ISO bracket is an operation in which consecutive shootings, that is, shootings of a plurality of frames are performed while changing an exposure parameter, that is, ISO sensitivity in every shooting of a single frame. The HDR bracket is an operation in which consecutive shootings, that is, shootings of a plurality of frames are performed while changing an exposure parameter, that is, a value of exposure in every shooting, that is, shooting of one frame. An image generated by the HDR bracket is used in HDR synthesis. The single shooting is an operation in which a single shooting, that is, shooting of only a single frame is performed.

If brightness of a main subject is not appropriate, it is easy for the shooting module 100 to fail in capturing of an image preferred by the user. It is easy for an image in which the main subject is very dark or bright to be captured. Further, it is easy for optimal brightness to be changed according to movement of the main subject and conditions of illumination light. A first operation includes only an operation in which it is easy for an image captured with exposure suitable for a case in which no confirmation of a subject is accompanied to be acquired. A first operation does not include an operation in which it is difficult for an image captured with exposure suitable for a case in which no confirmation of a subject is accompanied to be acquired.

When it is detected that the finder device 20a is mounted on the shooting device 10b, the control unit 103b controls the shooting module 100 such that the first operation based on the first information is performed. For example, when the finder device 20a is mounted on the shooting device 10b and the shooting module 100 enters a state in which shooting is possible, the control unit 103b sets any one of exposure of the shooting module 100 and ISO sensitivity. After any one of the exposure of the shooting module 100 and the ISO sensitivity is set, the control unit 103b controls the shooting module 100 such that shooting of a single frame is performed. The control unit 103b performs a setting of any one of the exposure of the shooting module 100 and the ISO sensitivity, and the control of the shooting of a single frame a plurality of times. The exposure of the shooting module 100 and the ISO sensitivity are different in every shooting of the single frame.

In the seventh example of the second embodiment, when the finder device 20a is mounted on the shooting device 10b, consecutive shootings are performed. At least one of images of a plurality of frames acquired by the consecutive shootings may be an image captured with an optimal setting. Therefore, it is possible to reduce a degree of difference between the setting of the shooting and an optimal setting. It is easy for the shooting module 100 to succeed in capturing of an image preferred by the user.

Modification Example of Second Embodiment

FIG. 15 shows first information A81 and second information A82 in a modification example of the second embodiment. The first information A81 corresponds to a case in which the finder device 20a is mounted. The second information A82 corresponds to a case in which the finder device 20a is not mounted. The first information A81 and the second information A82 include information on a plurality of consecutive image processing in which a shooting parameter (color parameter or image processing parameter) is different or a single image processing.

The first information A81 includes information on a plurality of first operations. The second information A82 includes information on a plurality of second operations. The plurality of the first operations are operations in which a plurality of consecutive image processing are performed. Specifically, the plurality of the first operations may be a white balance bracket and a specific filter bracket. The plurality of the second operations include an operation in which a plurality of consecutive image processing are performed, and an operation in which a single image processing is performed. Specifically, the plurality of the second operations are a white balance bracket, a specific filter bracket, and a single image processing. The white balance bracket and the specific filter bracket are common to the first operation and the second operation. The first information A81 may include information on only any one of the white balance bracket and the specific filter bracket.

The white balance bracket is an operation in which a plurality of consecutive image processing are performed on an image acquired by a single shooting, that is, a shooting of a single frame while changing a color parameter regarding the tint property to generate a plurality of images. The specific filter bracket is an operation in which a plurality of consecutive image processing are performed on an image acquired by a single shooting, that is, shooting of a single frame while changing an image processing parameter (image processing filter parameter) including a color parameter to generate a plurality of images. The single image processing is an operation in which only a single image processing is performed on an image acquired by a single shooting, that is, shooting of a single frame to generate only a single image.

If the color of the main subject is not appropriate, it is easy for the shooting module 100 to fail in capturing of an image preferred by the user. It is easy for the main subject to be imaged in a color different from actual color. Further, it is easy for the color of the subject to be changed according to movement of the main subject and conditions of illumination light. A first operation includes only an operation in which it is easy for an image in which the subject is captured in color suitable for a case in which no confirmation of the subject is accompanied to be acquired. A first operation does not include an operation in which it is difficult for an image in which the subject is captured in color suitable for a case in which no confirmation of the subject is accompanied to be acquired.

In a modification example of the second embodiment, the process of step S110 and the process of step S115 are changed to the following process. When it is detected that the finder device 20a is mounted on the shooting device 10b, the control unit 103b controls image processing such that the first operation based on the first information is performed. For example, when the finder device 20a is mounted on the shooting device 10b and the shooting module 100 enters a state in which shooting is possible, the control unit 103b sets any one of a parameter regarding the tint property and an image processing parameter. After any one of the parameter regarding the tint property and the image processing parameter is set, the control unit 103b performs image processing on the image generated by the shooting module 100. The control unit 103b performs the setting of any one of the parameter regarding the tint property and the image processing parameter and the image processing a plurality of times. A same image is used for a plurality of consecutive image processing. The parameter regarding the tint property and the image processing parameter are different for each image processing. Through the above process, the control unit 103b generates a plurality of images from a single image. When it is detected that the finder device 20a is not mounted on the shooting device 10b, the control unit 103b controls image processing such that the second operation based on the second information is performed.

In the modification example of the second embodiment, when the finder device 20a is mounted on the shooting device 10b, a plurality of consecutive image processing are performed. At least one of a plurality of images acquired by the plurality of times of image processing may be an image processed with an optimal setting. Therefore, it is possible to reduce a degree of difference between the setting of the shooting and an optimal setting. It is easy for the shooting module 100 to succeed in capturing of an image preferred by the user.

Eighth Example of Second Embodiment

FIG. 16 shows first information A91 and second information A92 in an eighth example of the second embodiment. The first information A91 corresponds to a case in which the finder device 20a is mounted. The second information A92 corresponds to a case in which the finder device 20a is not mounted. The first information A91 and the second information A92 include information on consecutive shootings or a single shooting.

The first information A91 includes information on a first operation. The second information A92 includes information on a plurality of second operations. A first operation is an operation in which consecutive shootings are performed. Specifically, the a first operation is an operation in which N times of shooting is performed per second from M seconds before a reference timing. The plurality of the second operations includes an operation in which consecutive shootings are performed, and an operation in which only a single shooting is performed. Specifically, the plurality of the second operations are the operation in which N times of shooting is performed per second from M seconds before the reference timing, and single shooting. M is an arbitrary positive real number greater than one. N is an arbitrary positive integer greater than two. The operation in which N times of shooting is performed per second from M seconds before the reference timing is common to the first operation and the second operation.

The operation in which N times of shooting is performed per second from M seconds before the reference timing is an operation in which an image generated by N times of shooting per second from M seconds before the reference timing to the reference timing is acquired. The single shooting is an operation in which a single shooting, that is, shooting of only a single frame is performed.

As described in the sixth example and the seventh example of the second embodiment, if the focus or the like of the main subject is not appropriate, it is easy for the shooting module 100 to fail in capturing of an image preferred by the user. A first operation includes only an operation in which it is easy for an image suitable for a case in which no confirmation of the subject is accompanied to be acquired. A first operation does not include an operation in which it is difficult for an image suitable for a case in which no confirmation of the subject is accompanied to be acquired.

When it is detected that the finder device 20a is mounted on the shooting device 10b, the control unit 103b controls the shooting module 100 such that the first operation based on the first information is performed. For example, when the finder device 20a is mounted on the shooting device 10b, and the shooting module 100 enters a state in which shooting is possible, the control unit 103b continuously acquires the image from the shooting module 100. The acquired images are sequentially stored in the storage module 102a. The images are buffered.

When the shooting operation switch 104 receives the shooting instruction, the control unit 103b may refer to the plurality of images stored in the storage module 102a at a predetermined time. The predetermined time is a time from M seconds before the reference timing to the reference timing. The reference timing is a timing at which the shooting operation switch 104 has received the shooting instruction. The control unit 103b selects an image at a rate of N sheets per second. The selected image is stored in the storage module 102a. The control unit 103b stores a plurality of images captured in a predetermined time on the basis of the reference timing in the storage module 102a.

In the eighth example of the second embodiment, when the finder device 20a is mounted on the shooting device 10b, consecutive shootings are performed. At least one of images of a plurality of frames acquired by the consecutive shootings may be an image captured with an optimal setting. Therefore, it is possible to reduce a degree of difference between the setting of the shooting and an optimal setting. It is easy for the shooting module 100 to succeed in capturing of an image preferred by the user.

The first to eighth examples of the second embodiment and the modification example of the second embodiment are applicable to the shooting device 10b of the first embodiment.

Third Embodiment

Figure 17:
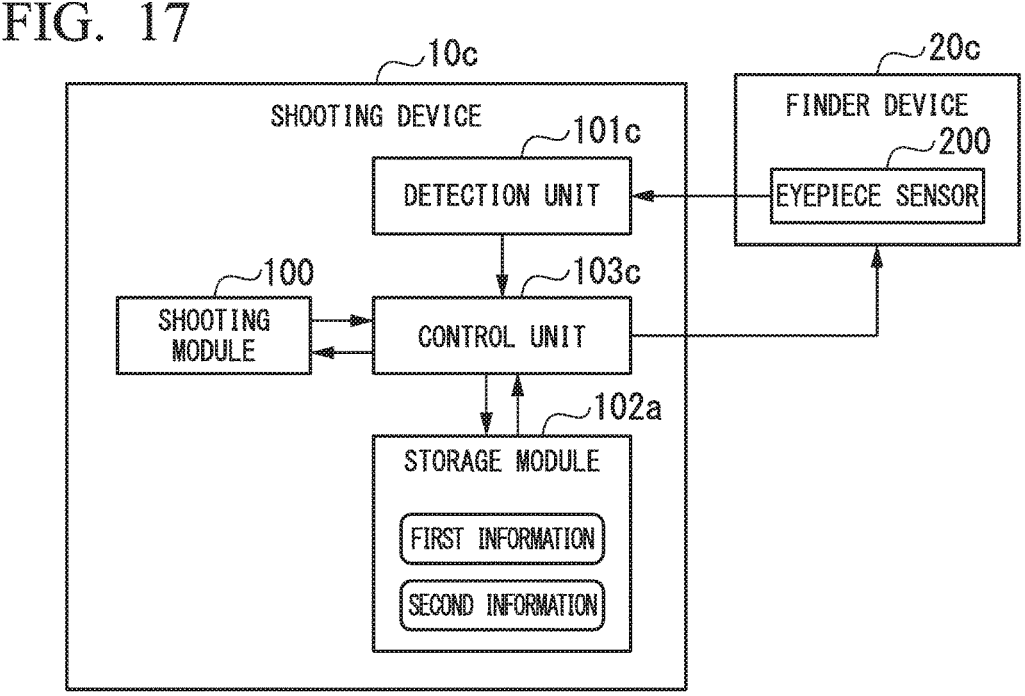
FIG. 17 is a block diagram showing a configuration of a shooting device of a third embodiment of the present invention.

FIG. 17 shows a configuration of a shooting device 10c of a third embodiment of the present invention. As shown in FIG. 17, the shooting device 10c includes a shooting module 100, a detection unit 101c, a storage module 102a, and a control unit 103c.

A difference between the configuration shown in FIG. 17 and the configuration shown in FIG. 1 will be described. The finder device 20c includes an eyepiece sensor 200. The eyepiece sensor 200 detects whether or not an eye is close to the eyepiece sensor. The eyepiece sensor 200 outputs eyepiece information indicating a result of the detection. Thus, the finder device 20c outputs eyepiece information indicating whether or not an eye is close to the eyepiece sensor 200. The detection unit 101c detects whether or not an eye is close to the eyepiece sensor 200 on the basis of the eyepiece information. The control unit 103c controls the shooting module 100 or the image processing such that the first operation based on the first information is performed when it is detected that the finder device 20c is mounted on the shooting device 10c and it is detected that an eye is close to the eyepiece sensor 200.

For example, any one of the sixth to eighth examples of the second embodiment and the modification example of the second embodiment is applied to the shooting device 10c. The control unit 103c starts consecutive shootings or a plurality of consecutive image processing based on the first information when it is detected that an eye is close to the eyepiece sensor 200 after it is detected that the finder device 20c is mounted on the shooting device 10c.

For example, the control unit 103c reads a program including an instruction that defines the operation of the control unit 103c, and executes the read program. A realization form of this program is the same as that of the program that realizes the function of the control unit 103a shown in FIG. 1.

The configuration shown in FIG. 17 is the same as that shown in FIG. 1 except for the above-mentioned points.

In the third embodiment, only when it is detected that the finder device 20c is mounted on the shooting device 10c and it is detected that an eye is close to the eyepiece sensor 200, the shooting module 100 or the image processing is controlled such that the first operation based on the first information is performed. Therefore, the shooting device 10c can start the setting of the shooting or the image processing earlier.

While preferred embodiments of the invention have been described and shown above, it should be understood that these are exemplary of the invention and are not to be considered as limiting. Additions, omissions, substitutions, and other modifications can be made without departing from the spirit and scope of the present invention. Accordingly, the invention is not to be considered as being limited by the foregoing description, and is only limited by the scope of the appended claims.

What is claimed is:

1. A shooting device, comprising:
   a camera configured to perform shooting to generate an image;
   a detection circuit configured to mechanically or electrically detect whether or not a finder device is mounted on the shooting device, the finder device being mountable on and detachable from the shooting device and being configured to display an optical image of a subject or an image of the subject output from the camera;
   a storage module comprising a volatile or a nonvolatile recording medium, the storage module configured to store first information and second information, the first information indicating one or more operations of a first set of operations executable when the finder device is mounted on the shooting device, the second information indicating one or more operations of a second set of operations executable when the finder device is not mounted on the shooting device, wherein the first set of operations is a subset of the second set of operations; and a controller configured to read a program and cause a computer of the shooting device to execute the program for controlling a lens module connected to the camera to perform one or more operations belonging to the first set of operations based on the first information when the finder device is detected to be mounted on the shooting device by the detection circuit, and controlling the lens module to perform one or more operations belonging to the second set of operations based on the second information when the finder device is detected to be not mounted on the shooting device by the detection circuit, wherein the first information and the second information are information indicating a range of a parameter used for controlling the lens module, and the parameter is used for controlling an aperture of the lens module or an angle of view of the lens module, wherein the range of the parameter indicated by the first information is determined by excluding a partial range of the parameter in which a depth of field of the lens module is controlled to be shallow from the range of the parameter indicated by the second information, in a situation when the parameter is used for controlling the aperture of the lens module, and wherein the range of the parameter indicated by the first information is determined by excluding a partial range of the parameter corresponding to a telephoto side of the lens module from the range of the parameter indicated by the second information, in a situation when the parameter is used for controlling the angle of view of the lens module.

2. A shooting method, comprising:

mechanically or electrically detecting whether or not a finder device is mounted on a shooting device, the finder device being mountable on and detachable from the shooting device and being configured to display an optical image of a subject or an image of the subject output from a camera that is configured to perform shooting to generate the image; and controlling a lens module connected to the camera to perform a first operation based on first information when the finder device is detected to be mounted on the shooting device, and controlling the lens module to perform a second operation based on second information when the finder device is detected to be not mounted on the shooting device, wherein the first information indicates one or more of a first set of operations executable when the finder device is mounted on the shooting device, and the second information indicates one or more of a second set of operations executable when the finder device is not mounted on the shooting device, wherein the first set of operations is a subset of the second set of operations, wherein the first information and the second information are information indicating a range of a parameter used for controlling an aperture of the lens module or an angle of view of the lens module, wherein the range of the parameter indicated by the first information is determined by excluding a partial range of the parameter in which a depth of field of the lens module is controlled to be shallow from the range of the parameter indicated by the second information, in a situation when the parameter is used for controlling the aperture of the lens module, and wherein the range of the parameter indicated by the first information is determined by excluding a partial range of the parameter corresponding to a telephoto side of the lens module from the range of the parameter indicated by the second information, in a situation when the parameter is used for controlling the angle of view of the lens module.

3. A non-transitory computer readable recording medium storing a program for causing a computer of a shooting device on which a finder device is mountable to execute:

mechanically or electrically detecting whether or not a finder device is mounted on a shooting device, the finder device being mountable on and detachable from the shooting device and being configured to display an optical image of a subject or an image of the subject output from a camera that is configured to perform shooting to generate the image; and controlling a lens module connected to the camera to perform a first operation based on first information when the finder device is detected to be mounted on the shooting device, and controlling the lens module to perform a second operation based on second information when the finder device is detected to be not mounted on the shooting device, wherein the first information indicates one or more of a first set of operations executable when the finder device is mounted on the shooting device, and the second information indicates one or more of a second set of operations executable when the finder device is not mounted on the shooting device, wherein the first set of operations is a subset of the second set of operations, wherein the first information and the second information are information indicating a range of a parameter used for controlling an aperture of the lens module or an angle of view of the lens module, wherein the range of the parameter indicated by the first information is determined by excluding a partial range of the parameter in which a depth of field of the lens module is controlled to be shallow from the range of the parameter indicated by the second information, in a situation when the parameter is used for controlling the aperture of the lens module, and wherein the range of the parameter indicated by the first information is determined by excluding a partial range of the parameter corresponding to a telephoto side of the lens module from the range of the parameter indicated by the second information, in a situation when the parameter is used for controlling the angle of view of the lens module.

4. The shooting device according to claim 1, wherein the finder device includes an eyepiece sensor configured to output an eyepiece information indicating whether or not an eye is close to the eyepiece sensor, wherein the detection circuit is configured to further detect whether the eye is close to the eyepiece sensor based on the eyepiece information, and wherein the controller is configured to control the lens module to perform the first operation or the plurality of first operations based on the first information in a situation when the detection circuit detects that the finder device is mounted on the shooting device and the eye is close to the eyepiece sensor.

* * * * *

UNITED STATES PATENT AND TRADEMARK OFFICE
CERTIFICATE OF CORRECTION

PATENT NO. : 10,284,767 B2  
APPLICATION NO. : 15/581257  
DATED : May 7, 2019  
INVENTOR(S) : Kensuke Ishii et al.

Page 1 of 1

It is certified that error appears in the above-identified patent and that said Letters Patent is hereby corrected as shown below:

On the Title Page

Replace:
"Inventors: Kensuke Ishii, (Tokyo, JP); Saori Matsumoto, (Tokyo, JP); Arata Shinozaki, (Tokyo, JP); Kiiko Takamatsu, (Tokyo, JP); Yoshitaka Sata, (Tokyo, JP)"

With:
-- Inventors: Kensuke Ishii, (Tokyo, JP); Saori Matsumoto, (Tokyo, JP); Arata Shinozaki, (Tokyo, JP); Kiiko Takamatsu, (Tokyo, JP); Yoshitaka Sato, (Tokyo, JP) --

Signed and Sealed this  
Twenty-sixth Day of November, 2019

Andrei Iancu  
*Director of the United States Patent and Trademark Office*